United States Patent
Bahnen et al.

(10) Patent No.: US 7,559,752 B2
(45) Date of Patent: Jul. 14, 2009

(54) DUAL-SHAFT VACUUM PUMP

(75) Inventors: Rudolf Bahnen, Roetgen (DE); Josef Hodapp, Köln (DE); Karl-Heinz Ronthaler, Zülpich (DE)

(73) Assignee: Oerlikon Leybold Vacuum GmbH, Cologne (DE)

( * ) Notice: Subject to any disclaimer, the term of this patent is extended or adjusted under 35 U.S.C. 154(b) by 442 days.

(21) Appl. No.: 10/516,562

(22) PCT Filed: May 23, 2003

(86) PCT No.: PCT/EP03/05402

§ 371 (c)(1),
(2), (4) Date: Jun. 16, 2005

(87) PCT Pub. No.: WO03/100258

PCT Pub. Date: Dec. 4, 2003

(65) Prior Publication Data

US 2005/0232791 A1    Oct. 20, 2005

(30) Foreign Application Priority Data

May 29, 2002    (DE) ............................. 102 23 869

(51) Int. Cl.
F04B 17/00    (2006.01)

(52) U.S. Cl. .................. 417/410.1; 417/410.4

(58) Field of Classification Search .............. 318/721, 318/723, 808, 722; 417/247, 410.4, 410.1; 310/154.12, 808, 722
See application file for complete search history.

(56) References Cited

U.S. PATENT DOCUMENTS

| | | | |
|---|---|---|---|
| 2,640,428 A | 6/1953 | Houghton | |
| 2,937,807 A * | 5/1960 | Lorenz | 417/247 |
| 3,234,445 A * | 2/1966 | Calvert | 318/703 |
| 3,584,276 A * | 6/1971 | Ringland et al. | 318/721 |
| 3,956,650 A * | 5/1976 | Field, II | 310/156.65 |
| 4,312,628 A * | 1/1982 | Yamamura | 417/423.4 |
| 4,734,633 A | 3/1988 | Ono et al. | |
| 4,818,890 A * | 4/1989 | Mose et al. | 290/52 |
| 5,378,128 A * | 1/1995 | Yanagisawa | 418/9 |
| 5,641,276 A | 6/1997 | Heidelberg et al. | |
| 5,779,453 A | 7/1998 | Nagayama et al. | |
| 5,793,178 A * | 8/1998 | Biais | 318/700 |
| 5,816,782 A * | 10/1998 | Nagayama et al. | 417/410.4 |
| 6,577,035 B2 * | 6/2003 | Coyac et al. | 310/90 |

FOREIGN PATENT DOCUMENTS

| | | |
|---|---|---|
| DE | 31 50 393 | 7/1983 |
| DE | 38 28 608 | 3/1990 |
| DE | 41 00 864 | 7/1992 |
| DE | 41 21 684 | 1/1993 |
| DE | 197 36 907 | 3/1999 |

(Continued)

*Primary Examiner*—Devon Kramer
*Assistant Examiner*—Vikansha Dwivedi
(74) *Attorney, Agent, or Firm*—Fay Sharpe LLP

(57) ABSTRACT

A two-shaft vacuum pump has a simplified drive motor. The two-shaft vacuum pump has a synchronous motor as a drive motor which motor rotor is permanently excited. Permanently excited motor rotors are sufficiently small and of light weight such that rotor supporting bearings can be omitted. This also eliminates the problems associated with cooling and lubrication of the supporting bearings.

14 Claims, 3 Drawing Sheets

FOREIGN PATENT DOCUMENTS

| | | |
|---|---|---|
| DE | 42 05 926 | 9/1999 |
| DE | 199 03 069 | 8/2000 |
| DE | 696 07 127 | 9/2000 |
| DE | 199 44 194 | 3/2001 |
| EP | 0 678 966 | 10/1995 |
| EP | 0 811 766 | 12/1997 |
| EP | 1 065 777 | 1/2001 |

* cited by examiner

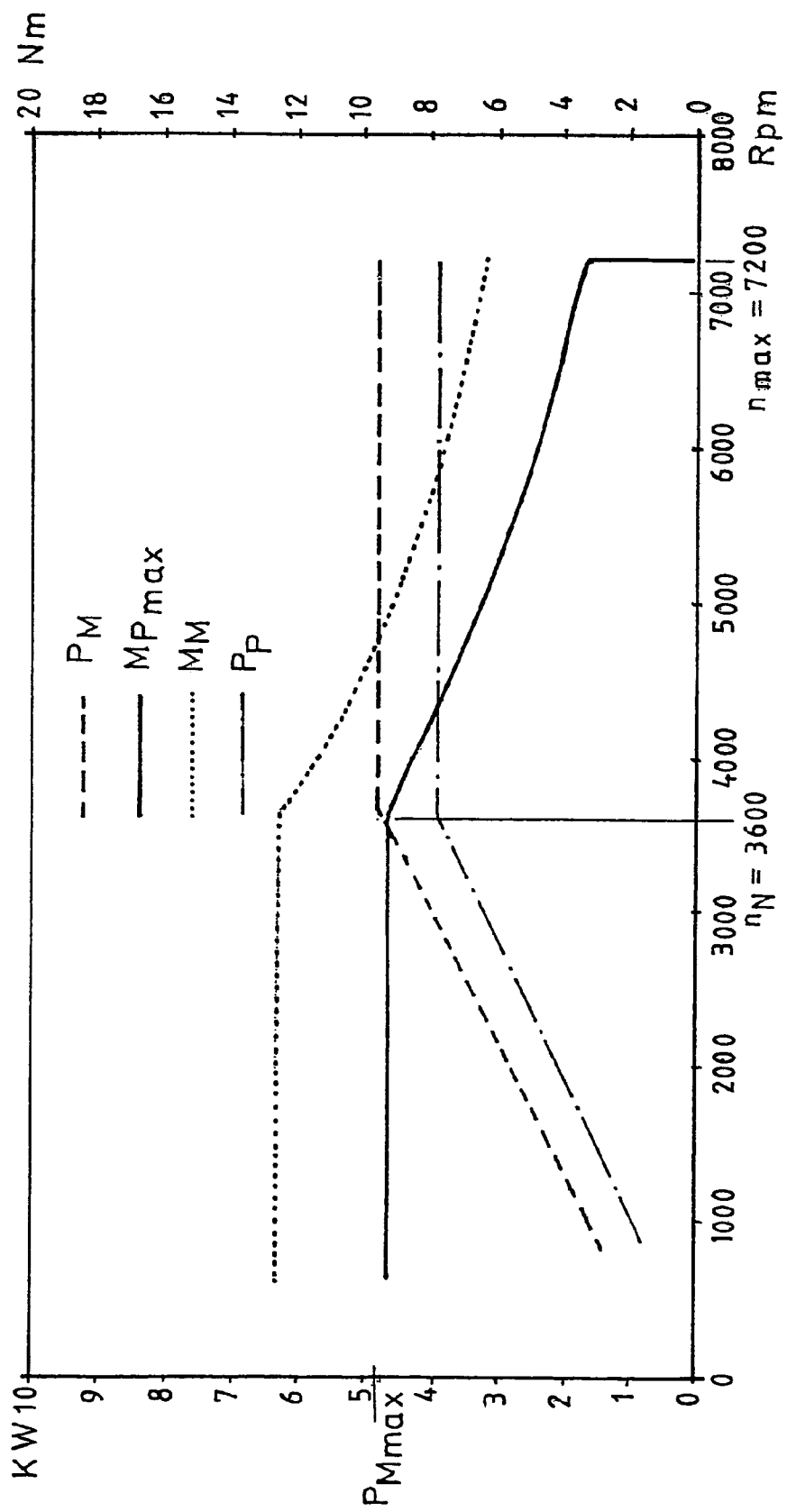

DUAL-SHAFT VACUUM PUMP

The invention relates to a two-shaft vacuum pump comprising two shafts.

The rolling piston pump, also referred to as Roots pump, is a typical two-shaft vacuum pump. Both two shafts of the Roots pump comprise a rolling piston which roll off without contacting each other. One of the two shafts is driven by an electric drive motor, while the other shaft is synchronized with the drive shaft by means of a gear. During pumping operation the rolling pistons are strongly heated due to the gas compression.

In practice, only asychronous motors are used as drive motors. The motor rotor of the asynchronous motor arranged on the drive shaft is configured as a so-called cage rotor. The motor rotor configured as a cage rotor has a relatively large mass and axial overall length. Due to the necessarily resulting large unbalance forces and the vibrations resulting from the latter, the drive shaft must be supported by at least one supporting bearing in the area of the drive motor. Cooling and lubrication of the supporting bearing or bearings are, in particular owing to its/their arrangement in the gas-tightly sealed area of the vacuum pump, problematic and can be realized only at a high effort and expenditure.

From DE-A-38 28 608, which represents the prior art as referred to in the precharacterizing part of claim 1, a vacuum rolling piston pump is known which is driven by a synchronous motor. The concrete configuration of the motor rotor is not described. Synchronous motors are generally not suitable for use in vacuum pumps because the motor rotor is separately excited via heat-producing sliding contacts. A permanently excited synchronous motor rotor is unsuitable because it supplies, due to the constant rotor excitation, a torque maintained constant via the speed, and overheating of the pump rotor may occur at higher speeds. In the practice, synchronous motors are therefore not used for driving vacuum pumps.

It is an object of the invention to provide a two-shaft vacuum pump with an improved drive.

According to the invention, this object is achieved with the features of claim 1.

According to the invention, the drive motor is a synchronous motor, wherein the rotor is configured such that it is permanently excited by a permanent magnet. The permanently excited rotor of a synchronous motor has a small mass and a small overall length due to the constantly strong magnetic field and the low power loss. Owing to this fact, all shaft supporting bearing for additionally supporting the drive shaft may possibly be omitted, whereby the problems associated with cooling and lubrication of the supporting bearings are eliminated.

Due to the lower power loss in the permanently excited rotor, heating-up of the rotor and the problems associated with said heating-up are reduced, too.

Further, a synchronous motor power-limiting means is provided which limits the motor power to a fixed maximum motor power in a limiting range above a fixed rated motor speed. The power-limiting means limits the driving power to a constant value at a speed above the rated speed. This is effected by reduction of the torque at a shaft speed above the rated speed.

The motor power results from the following equation:

$$P_M = M_M \times \omega,$$

where
$\omega = 2\pi \cdot n,$
$P_M$ is the motor power,
$M_M$ is the motor torque at speed n, and
n is the motor speed.

The speed reduction in the limiting range ensures that the pump is capable of operating at high speeds of up to 8,000 revolutions per minute, but the pumping capacity is limited to a constant maximum value. The possibilities of dissipating the rolling piston heat are strongly restricted by the low gas pressure and the configuration. By limiting the motor power and thus the pumping capacity without simultaneous speed limitation, overheating of the vacuum pump and in particular the rolling pistons is reliably prevented, wherein, at the same time, a high gas volume flow is maintained. In the limiting range, the synchronous motor is operated in the so-called field-weakening range. The magnetic flux of the permanently magnetized motor rotor is constant such that a change in the motor torque can be effected only by a corresponding control of the stator field.

In practical applications, permanently excited motor rotors have so far not been used in vacuum pumps due the torque, which is maintained constant over the overall speed range owing to the operating principle applied, there was the danger of overheating of the rotor at high speeds caused by the compression heat which increases with the speed. In view of these drawbacks it has so far seemed unrealistic or impossible to use a permanently excited synchronous motor for driving a vacuum pump. Owing to the limitation of the motor power in the limiting range caused by the field-weakening operation the compression-induced heating of the motor rotor is limited to a constant value at higher speeds. Only this makes use of a permanently excited synchronous motor possible and sensible, wherein the maximum torque of the motor can be made use of until the limiting range has been reached.

According to a preferred aspect, the power-limiting means adjusts, in the limiting range, the phase angle between the electrical stator field and the magnetic field of the motor to an angle other than 90 degrees. The phase position of the electrical stator field is adjusted relative to the magnetic field of the rotor such that the torque is correspondingly reduced.

Alternatively or supplementary, the power-limiting means reduces, in the limiting range, the amount of the stator current. This, too, reduces the torque $M_M$ which is proportional to the stator current.

According to a preferred aspect, the power-limiting means adjusts, in the limiting range, the phase angle and/or the stator current as a function of the speed. With increasing speed in the limiting range between the rated speed and the maximum speed, the phase angle and/or the stator current are changed such that the torque decreases with increasing speed to such an extent that the motor power above the rated speed is always nearly constant. Thus, the maximum permissible motor power is made available, but not exceeded, at each speed. The vaccum pump is protected against overheating.

According to a preferred aspect, the shaft comprising the motor rotor is of overhung configuration and supported without a supporting bearing. The shaft is exclusively supported by the two main bearings arranged at the two longitudinal ends of the pump rotor. The structures required for cooling and lubricating motor supporting bearings are omitted.

Preferably, the motor rotor comprises a plurality of permanent magnets arranged on the outside ot the motor rotor body. It is also possible that one or a plurality of permanent magnets are arranged in a corresponding recess of the motor rotor body.

Preferably, the motor rotor comprises, in particular for operation with gases which may damage the motor materials, a rotor enclosure of a nonmagnetic material, which externally encloses the motor rotor body and the permanent magnets. Thus the permanent magnets disposed on the outside of the motor rotor body are secured and protected against any aggressive gases and liquids and thus against corrosion. The rotor enclosure may be made from a nonmagnetic metal or a plastic material.

According to a preferred aspect, a can of a nonmagnetic material is provided on the stator side, which can gas-tightly seals the rotor towards the stator. The can is made from a nonmagnetic material or a plastic material. The can gas-tightly seals the pump area towards the surroundings, wherein the motor rotor lies within the pump area and the motor stator lies outside the pump area. Due to the use of a permanently excited synchronous motor the gap between rotor and stator may be relatively large. This facilitates the insertion of a can.

According to a preferred aspect, a pump cover holding the can and a stator casing surrounding the motor stator are integrally formed. This configuration reduces the number of components and the number of joints.

Preferably, the permanent magnet is made from rare earths. With permanent magnets of rare earths strong magnetic fields of long duration can be realized at a small overall length.

Hereunder an embodiment of the invention is explained in detail with reference to the drawings in which:

FIG. 3 shows schematic representation showing the motor power, the motor torque, the pump moment characteristic curve and the pumping capacity of the vacuum pump shown in FIGS. 1 and 2 obtained with a 4.8 kW drive motor.

Figure 1:
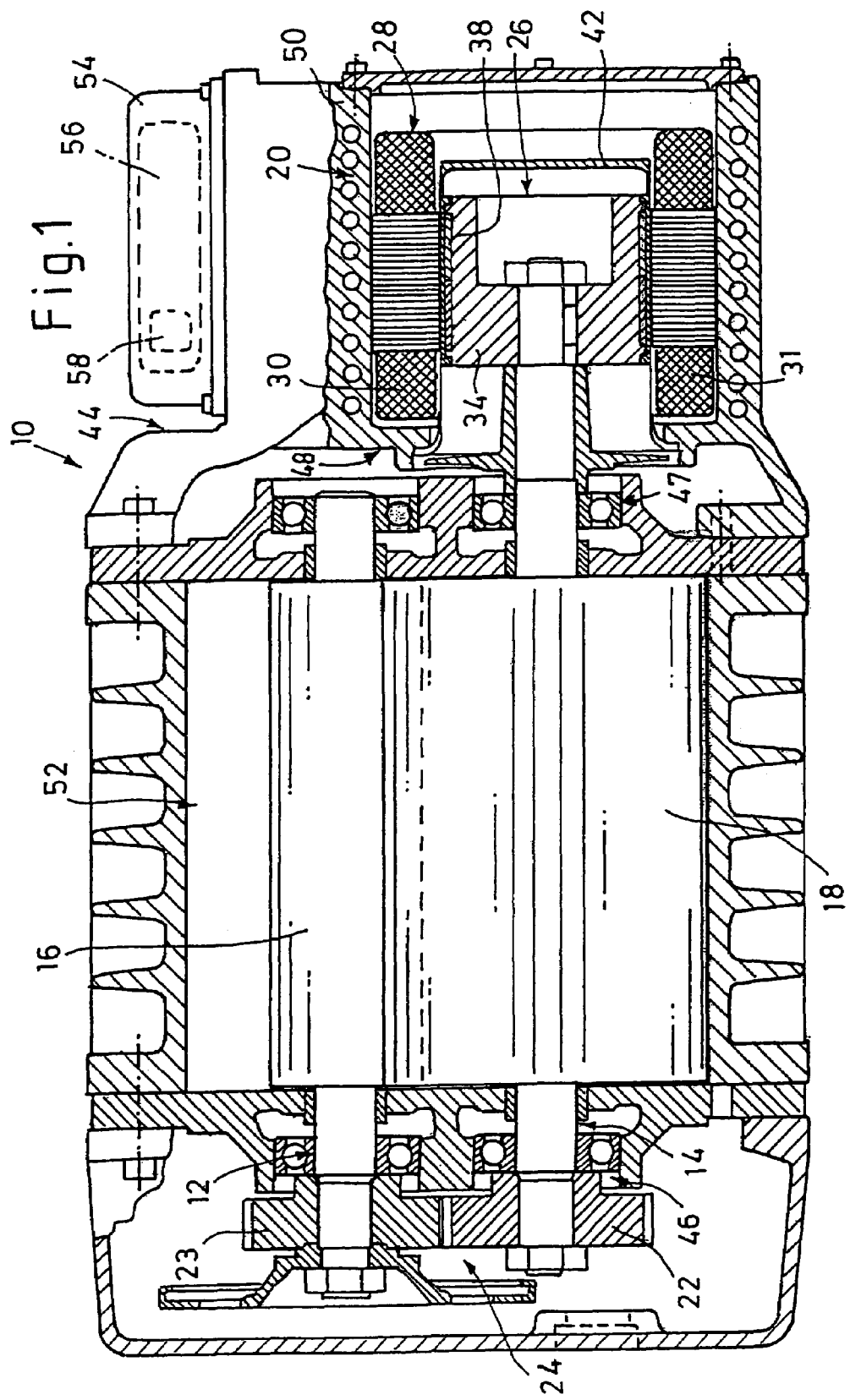
FIG. 1 shows a longitudinal section of a two-shaft. vacuum pump.

FIG. 1 shows a two-shaft vacuum pump 10 configured as a rolling-piston pump comprising two rotor shafts 12,14. Each rotor shaft 12,14 comprises a pump rotor 16,18 configured as a rolling piston. One rotor shaft 14 is driven by an electric drive motor 20, while the other shaft 12 is driven by a gear 24 formed by two toothed wheels 22,23 and synchronized with the rotor shaft 14.

The drive motor 20 is a synchronous motor and essentially comprises a permanently excited motor rotor 26 and a motor stator 28 having a plurality of stator coils 30,31.

Figure 2:
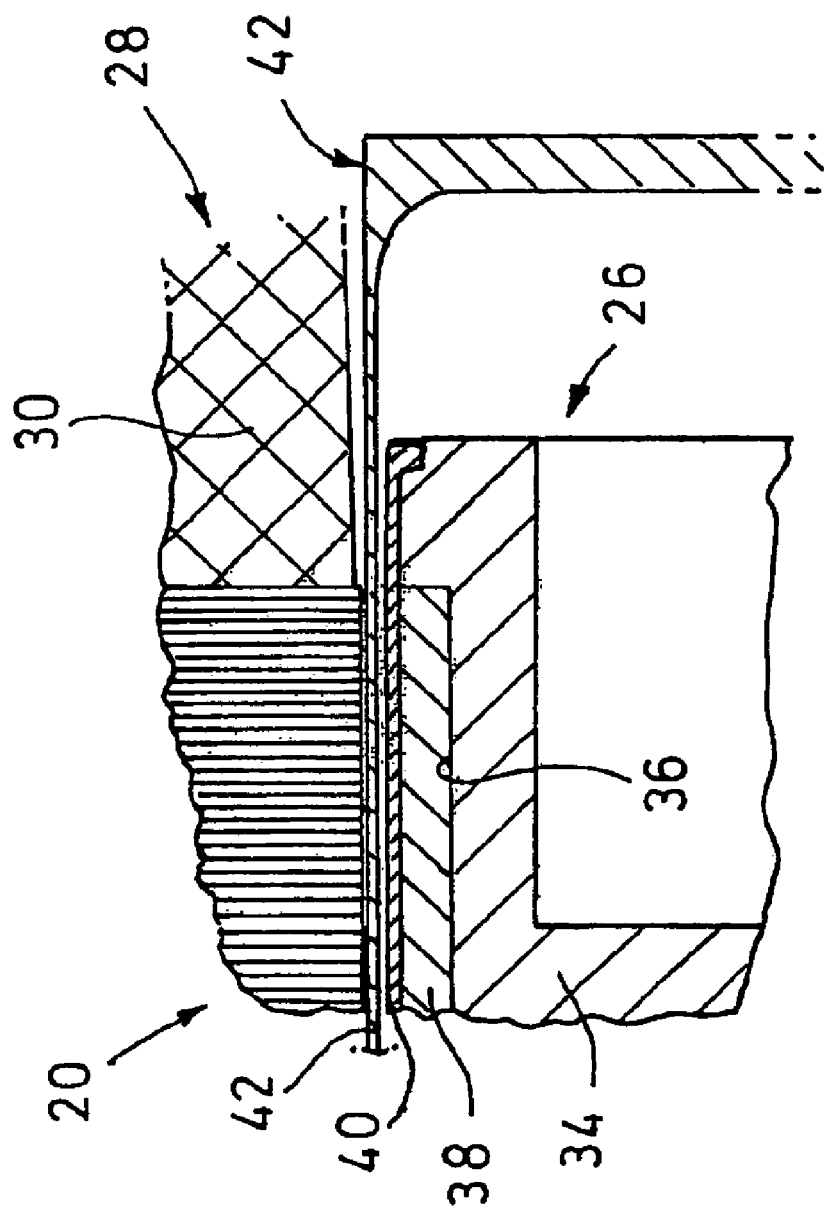
FIG. 2 shows a detail of the drive motor of the vacuum pump shown in FIG. 1.

The configuration of the motor rotor 26 is shown in an enlarged representation in FIG. 2. The motor rotor 26 comprises a pot-shaped rotor body 34 provided on its outer circumference with a plurality of recesses 36 into each of which a permanent magnet 38 of rare earths is glued. The overall outer circumference of the rotor 26 is enclosed by a cylindrical rotor enclosure 40 of a nonmagnetic material. The rotor enclosure 40 retains the permanent magnets 38 in the recesses 36 even at high rotor speeds and reliably shields the permanent magnets 38 against corrosion-developing gases and liquids. The rotor enclosure 40 is made from nonmagnetic high-grade steel, it may however also be made from a carbon fiber-reinforced plastic material or other nonmagnetic materials. The rotor body 34 can be of laminated or solid configuration. Between the rotor 26 and the stator 28 a pot-shaped can 42 is provided which is attached to a motor casing 44 on the stator side. The can gas-tightly seals the motor rotor 26 towards the stator 28. The can 42 is made from nonmagnetic high-grade steel, but can also be made from carbon fiber-reinforced plastic material or other nonmagnetic materials.

Due to its configuration as a synchronous motor rotor permanently excited by permanent magnets 38, the motor rotor 26 has a small axial overall length and a small mass. This allows the shaft 14 carrying the motor rotor 26 to be supported by two pump rotor rolling bearings 46,47 alone and its motor-side end to be configured without a supporting bearing. The motor rotor 26 is thus of completely overhung configuration.

The motor casing 44 is configured in one piece and comprises a pump cover 48 holding the can 42 and a stator casing 50 surrounding the motor stator 28. The pump cover 48 holds the can 42 and gas-tightly seals the suction chamber 52 towards the outside. In a housing 54 placed on the outside of the motor casing 44 a motor control 56 is accommodated. The motor control 56 controls the supply of the stator coils 30,31.

The motor control 56 comprises a synchronous motor power-limiting means 58 which, above a fixed rated motor speed nN, limits the motor power $P_M$ to a fixed maximum motor power $P_{Mmax}$, as shown in FIG. 3. Thus, the maximum pumping capacity is limited to a maximum value. This is necessary to prevent overheating of the pump rotors 16,18. The motor control 56 further comprises a frequency converter for starting up the drive motor and controlling the speed.

The motor power $P_M$ results from the following equation:

$$P_M = \omega \cdot M_M,$$

where $\omega = 2\pi \cdot n$, n is the speed, and $M_M$ is the motor torque. At increasing speed the motor power limitation can thus be effected only by reducing the motor torque $M_M$.

The speed range between the rated speed $n_N$, at which the maximum motor power $P_{Mmax}$ is reached, and the maximum speed $n_{max}$ is referred to as limiting range. Since the magnetic flux generated by the permanently excited motor rotor 26 is always constant, the torque in the limiting range can be obtained only by correspondingly controlling the stator coils 30,31. In the limiting range the stator coils 30,31 are thus controlled such that the torque is reduced with increasing speed and reciprocally proportional to the speed. In the limiting range the drive motor 20 is operated in the so-called field-weakening range.

For this purpose, in the limiting range the stator current is reduced in accordance with the necessary torque reduction. Alternatively or supplementary, the power-limiting means 58 can adjust, in the limiting range, the phase angle between the magnetic field of the motor and the electrical stator field to an angle-other than 90°. The control of the motor current and/or the phase angle in the limiting area is always effected as a function of the speed.

FIG. 3 shows that the pump torque $M_P$ and the pumping capacity $P_P$ are always somewhat below the motor torque $M_M$ and the motor power $P_M$, respectively, due to friction losses etc. Overheating of the pump rotor is excluded when the maximmum pumping capacity and motor power are correctly calculated and adjusted.

What is claimed is:

1. A two-shaft vacuum pump comprising:
   first and second rotor shafts,
   an electric drive motor which drives one of the rotor shafts, the drive motor being a synchronous motor with a motor rotor that is permanently excited, and
   a synchronous motor power-limiting device which limits compression-induced heating in the motor rotor to a constant value at speeds above a fixed rated motor speed ($n_N$) by limiting motor power ($P_M$) to a fixed maximum motor power ($P_{Mmax}$) in a limiting range above a fixed rated motor speed ($n_N$);
   wherein above the fixed rated motor speed, a stator current is adjusted such that motor torque ($M_M$) decreases reciprocally proportional to the motor speed as the motor speed increases.

2. The two-shaft vacuum pump according to claim 1, wherein the power-limiting device adjusts, in the limiting range, a phase angle between a magnetic field of the rotor and an electrical stator field to an angle other than 90°.

3. The two-shaft vacuum pump according to claim 1, wherein the power-limiting device reduces the stator current in the limiting range.

4. The two-shaft vacuum pump according to claim 1, wherein the power-limiting device adjusts, in the limiting range, the phase angle between the magnetic field of the rotor and at least one of the electrical stator field and the stator current as a function of the motor speed.

5. The two-shaft vacuum pump according to claim 1, wherein the driven rotor shaft driven by the drive motor is of cantilevered configuration and is supported without a supporting bearing on a motor-side end.

6. The two-shaft vacuum pump according to claim 1, wherein the motor rotor comprises a plurality of permanent magnets arranged on an outside surface of the motor rotor body.

7. The two-shaft vacuum pump according to claim 6, wherein the motor rotor comprises a rotor enclosure of a nonmagnetic material which externally encloses the motor rotor body and the plurality of permanent magnets.

8. The two-shaft vacuum pump according to claim 1, wherein on a stator side, a can of a nonmagnetic material is provided which gas-tightly seals the motor rotor with respect to the motor stator.

9. The two-shaft vacuum pump according to claim 8, wherein a pump cover holding the can and a stator casing are integrally formed.

10. The two-shaft vacuum pump according to claim 7, wherein at least one of the plurality of permanent magnets of the motor rotor include rare earth elements.

11. A two-shaft vacuum pump comprising:
a pair of rotor shafts;
a synchronous, permanently excited drive motor directly connected to one of the rotor shafts; and
a phase angle adjusting device which (a) below a rated motor speed, adjusts a phase angle between a motor rotor magnetic field and at least one of a motor stator magnetic field and a stator current and (b) at the rated motor speed ($n_N$), limits compression induced heating to a constant value by adjusting a stator current to fix an applied motor power ($P_{Mmax}$) such that motor torque ($M_M$) decreases reciprocally proportional to motor speed with increasing motor speed.

12. The two-shaft vacuum pump according to claim 1, wherein the power limiting device:
holds the motor power ($P_M$) constant, when the motor (n) speed reaches the rated motor speed ($n_N$); and
in response to an increase in gas pressure in the vacuum pump which reduces a motor torque ($M_M$), continues to hold the motor power ($P_M$) constant increasing the motor speed (n) above the rated motor speed ($n_N$).

13. The two-shaft vacuum pump according to claim 1, wherein in the limiting range above the rated motor speed ($n_N$), the power limiting device holds the motor power ($P_M$).

14. The two-shaft vacuum pump according to claim 1, wherein in the limiting range above the rated motor speed ($n_N$), the power limiting device permits the motor speed (n) to increase above the rated motor speed ($n_N$), such that in response to heating attributable to an increase in gas pressure in the vacuum pump, the motor speed increases and the motor torque ($M_M$) decreases.

* * * * *